June 10, 1930.  M. FOURMENT  1,763,229

APPARATUS FOR THE TREATMENT OF GASES AT HIGH TEMPERATURES

Filed Oct. 28, 1925

Inventor:
Marcel Fourment
By
Att.

Patented June 10, 1930

1,763,229

UNITED STATES PATENT OFFICE

MARCEL FOURMENT, OF PARIS, FRANCE

APPARATUS FOR THE TREATMENT OF GASES AT HIGH TEMPERATURES

Application filed October 28, 1925, Serial No. 65,294, and in France December 22, 1924.

My invention relates to a process and apparatus for the treatment of gases at high temperatures. In the known processes, gases, are treated at high temperatures in electric furnaces of the arc type, e. g. the Moissan or Berthelot furnaces as for instance, for the production of nitrogen compounds.

These methods however, have various drawbacks, because of the low efficiency, and the difficulty of controlling the arc. Other difficulties are found in the starting and the rupture of the arc. Moreover, it is impossible to obtain a uniform temperature which can be varied at will.

The present invention has for its object to obviate the aforesaid drawbacks, and essentially consists in the production of heat by high frequency induction for the treatment of gases.

Figure 1:
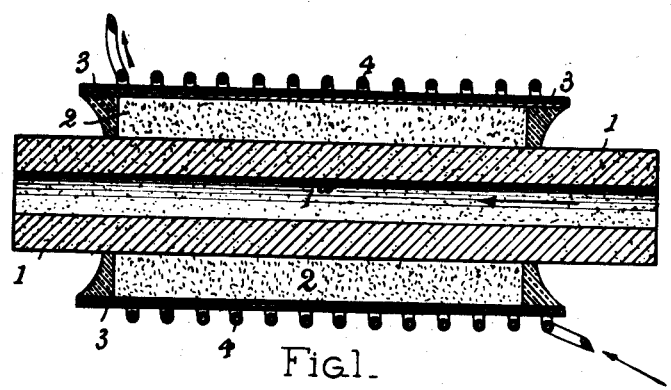
Figure 2:
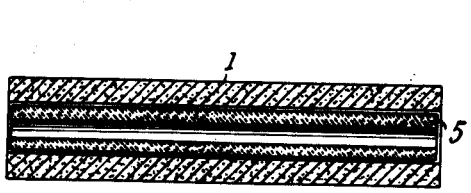
Figure 3:
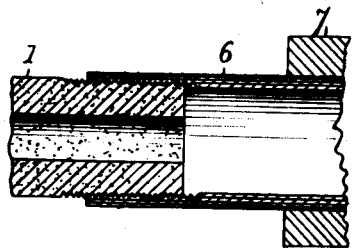
Figure 4:
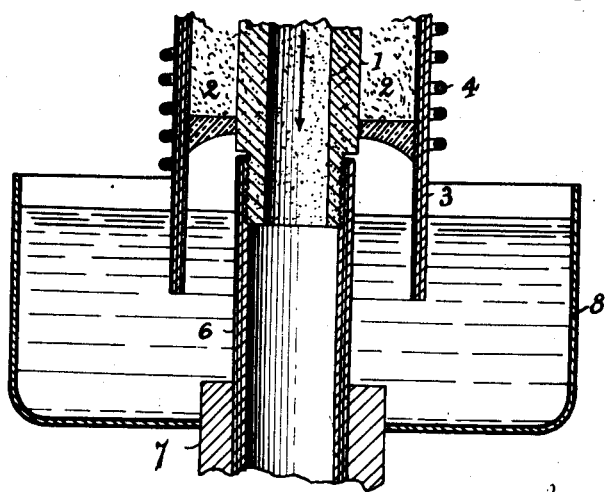

In the appended drawing illustrating by way of example various embodiments of the invention, Fig. 1 is a diagrammatic sectional view of the heating apparatus. Figs. 2 and 3 are detail views of such a heating apparatus showing modifications. Fig. 4 shows another modification comprising means for abruptly cooling the gases.

The apparatus shown in Fig. 1 comprises a tube 1 made of graphite or like material, embedded in by a suitable heat insulating substance 2 enclosed in a tube 3 of silica or other dielectric material. Upon the latter is placed an induction coil 4 which preferably consists of a thin copper tube which is cooled by water circulating therein.

The high frequency current in the induction coil 4 produces in the graphite tube 1 an induced current also of high frequency which rapidly heats the tube to a very high, constant temperature, the maximum temperature being at the central portion 1ª of the said tube, the temperature gradually decreasing towards the ends.

The high frequency induction current may be produced by any suitable means insuring a sufficient periodicity so as to provide for operation of the device also by induction without iron under proper conditions. I may for instance employ the discharges of a condenser or of a rotating circuit breaker.

In the treatment of certain gases, it may be inadvisable to have the gas come in contact with highly heated graphite as harmful reactions may result therefrom. In that case I employ a graphite tube 1 containing a lining 5 of fireproof material (Fig. 2) capable of resisting very high temperatures, the material for instance, may be circonia, or a like substance. For the same purpose, I may replace the graphite heating tube by a tube consisting of a metal, or an alloy which is a good conductor and can withstand the high temperature. For moderate temperatures, I may employ, for example, a platinum tube, and at higher temperatures, a tungsten tube, or the like.

Particular care must be taken with the packing of the joints in the conduits supplying the gas to the heating tubes, because of the high temperature in the said conduits. Fig. 3 shows a device which may be employed to advantage for this purpose, and in which a tube 6 of melted silica is screwed onto the graphite tube 1, a refractory cement being used for the packing.

The silica also acts as electric insulation for the graphite tube; a metal or other tube 7 may be connected with the silica tube 6.

Furthermore, I provide a means for the sudden cooling of the gases after treatment, so as to prevent inverse reaction. To that end, I employ the device shown in Fig. 4; as shown the silica gas tube 6 and the outer jacket 3 carrying the induction coil, are both immersed in a water circulation tank 8, whereby the gases flowing in the direction of the arrow are most effectively cooled.

My gas treating process is of course susceptible of numerous applications, for instance in all cases comprising reactions of gaseous products, syntheses, or like operations requiring high temperatures.

It should also be noted that, in addition to the production of heat in the said heating tube, an intense magnetic field is set up, which in certain cases may further the reactions to be effected.

I claim:

1. An apparatus for treating gases at high temperatures, comprising a conduit of graphite lined internally with a refractory substance, a heat insulating jacket surrounding said conduit, an envelope made of a dielectric substance enclosing said jacket and a high frequency inductance coil encircling said jacket.

2. An apparatus as specified in claim 1, including a tube consisting of melted silica screwed onto said conduit, and a packing of refractory cement at the joint of said tube and said conduit.

3. An apparatus as specified in claim 1, including a tube consisting of melted silica screwed onto said conduit, and a packing of refractory cement at the joint of said tube and said conduit, and a water circulating tank for the immersion therein of the ends of said tube and said dielectric envelope.

In testimony whereof he has affixed his signature.

MARCEL FOURMENT.